(12) United States Patent
Kwon (10) Patent No.: US 7,884,987 B2
(45) Date of Patent: Feb. 8, 2011

(54) SCANNING DISPLAY DEVICE

(75) Inventor: Jae Wook Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 895 days.

(21) Appl. No.: 11/723,535

(22) Filed: Mar. 20, 2007

(65) Prior Publication Data

US 2007/0223542 A1    Sep. 27, 2007

(30) Foreign Application Priority Data

Mar. 21, 2006    (KR) ...................... 10-2006-0025653

(51) Int. Cl.
*G02B 26/10* (2006.01)
*G02B 26/00* (2006.01)
*G03B 21/28* (2006.01)

(52) U.S. Cl. .................. 359/201.2; 353/37; 235/462.38

(58) Field of Classification Search ............. 353/37, 353/50, 51, 73; 359/197.1, 198.1, 199.1, 359/200.1, 201.1, 201.2, 202.1, 203.1, 212.1, 359/212.2, 213.1, 216.1, 218.1, 219.1, 219.2, 359/217.1, 223.1, 850, 851, 865; 250/557, 250/230–236, 216; 235/462.01, 462.09, 235/462.3, 462.38; 345/205, 204, 94, 98–100, 345/108, 110

See application file for complete search history.

(56) References Cited

U.S. PATENT DOCUMENTS

| | | | | |
|---|---|---|---|---|
| 4,874,215 A | * | 10/1989 | Montagu ................. | 359/213.1 |
| 5,821,521 A | * | 10/1998 | Bridgelall et al. ...... | 235/462.32 |
| 6,515,278 B2 | * | 2/2003 | Wine et al. .................. | 250/234 |
| 6,776,492 B1 | * | 8/2004 | Chang ......................... | 353/99 |

FOREIGN PATENT DOCUMENTS

| | | |
|---|---|---|
| KR | 10-1993-0021262 | 5/1994 |
| KR | 10-2002-7005417 | 7/2002 |
| KR | 10-2004-7009723 | 10/2004 |
| KR | 10-2005-0072290 | 11/2006 |

* cited by examiner

*Primary Examiner*—Thanh X Luu
*Assistant Examiner*—Jennifer Bennett
(74) *Attorney, Agent, or Firm*—McKenna Long & Aldridge LLP (57) ABSTRACT

A scanning display device is disclosed. The scanning display device includes: first to M-th scan mirrors (where M is an integer of at least 2), each of which scans a light signal in a first direction; and a scanning unit for scanning the light signal scanned by each of the first to M-th scan mirrors in a second direction, wherein a m-th scan mirror (where $1 \leq m \leq M-1$) scans the light signal in the first direction, and a n-th scan mirror (where $2 \leq n \leq M$) adjacent to the m-th scan mirror scans the light signal scanned by the m-th scan mirror in the first direction.

9 Claims, 8 Drawing Sheets

FIG. 1

RELATED ART

RELATED ART

SCANNING DISPLAY DEVICE

This application claims the benefit of Korean Patent Application No. 10-2006-0025653, filed on Mar. 21, 2006, which is hereby incorporated by reference as if fully set forth herein.

BACKGROUND OF THE INVENTION

1. Field of the Invention

The present invention relates to a display device, and more particularly to a scanning display device for performing a scanning action using a scan mirror.

2. Discussion of the Related Art

A conventional laser scanning display device uses a polygon mirror and a galvanometer to scan a laser beam acting as a light signal on the screen. In this case, the polygon mirror may scan the laser beam in a horizontal direction, and the galvanometer may scan the laser beam in a vertical direction. Otherwise, the polygon mirror may scan the laser beam in the vertical direction, and the galvanometer may scan the laser beam in the horizontal direction.

However, considering system minimization, resolution, reliability, and production costs, a large number of research institutions generally use a MEMS mirror instead of a polygon mirror. For the convenience of description, the above-mentioned MEMS mirror is referred to as a micro-scanning mirror.

The micro-scanning mirror is activated at a resonance frequency based on spring-damper characteristics of a hinge during the horizontal scanning process. If the micro-scanning mirror is driven at the resonance frequency, a plurality of scanning angles can be implemented with less energy. In this case, the resonance frequency is designed to be equal to a horizontal synchronous frequency of the screen. Also, the micro-scanning mirror may scan the laser beam on the screen in the vertical direction.

The micro-scanning mirror driven at a resonance frequency to scan the laser beam in the horizontal direction scans the laser beam on the screen in the form of a sinusoid. Therefore, the micro-scanning mirror has different speeds at individual scanning locations, such that the laser-beam traveling time per unit length is changed. Therefore, there is a difference in quantity of the laser beam at individual pixels of the screen, and there is a difference in brightness at individual pixels of the screen.

Figure 1:
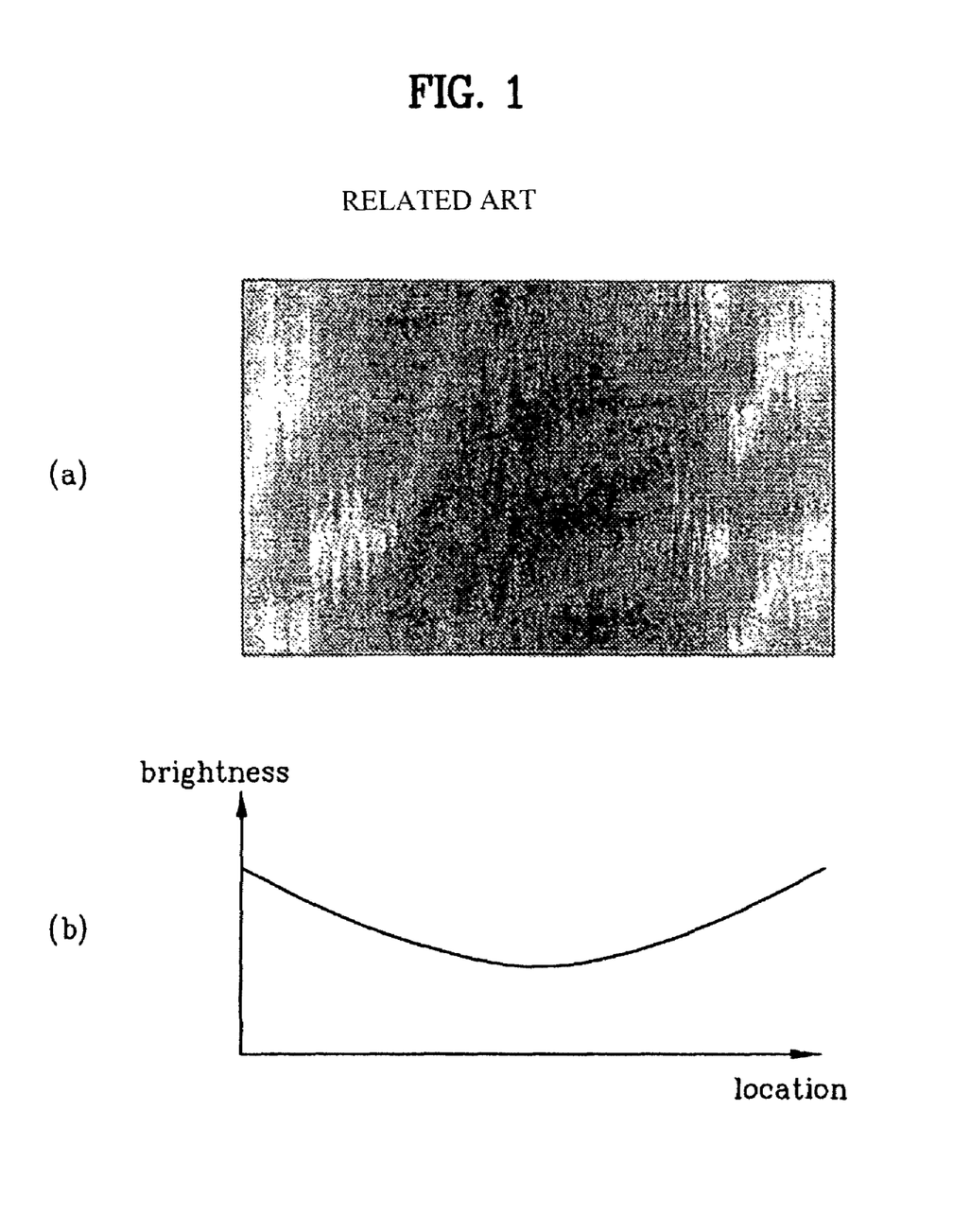
FIGS. 1A and 1B are conceptual diagrams illustrating a difference in brightness of the scanned screen of a conventional display device.

FIGS. 1A and 1B are conceptual diagrams illustrating a difference in brightness of the scanned screen of the conventional display device. FIG. 1A shows the distribution of brightness of the screen. FIG. 1B is a graph illustrating a difference in brightness of the screen, in which the horizontal axis of the graph indicates the location and the vertical axis of the graph indicates the brightness.

In more detail, the brightness difference occurs according to the screen locations shown in FIG. 1A, as denoted by FIG. 1B. In other words, as shown in FIG. 1B, the closer the brightness is to the center of the screen, the darker the brightness. The closer the brightness is to the edge of the screen, the lighter the brightness.

Figure 2:
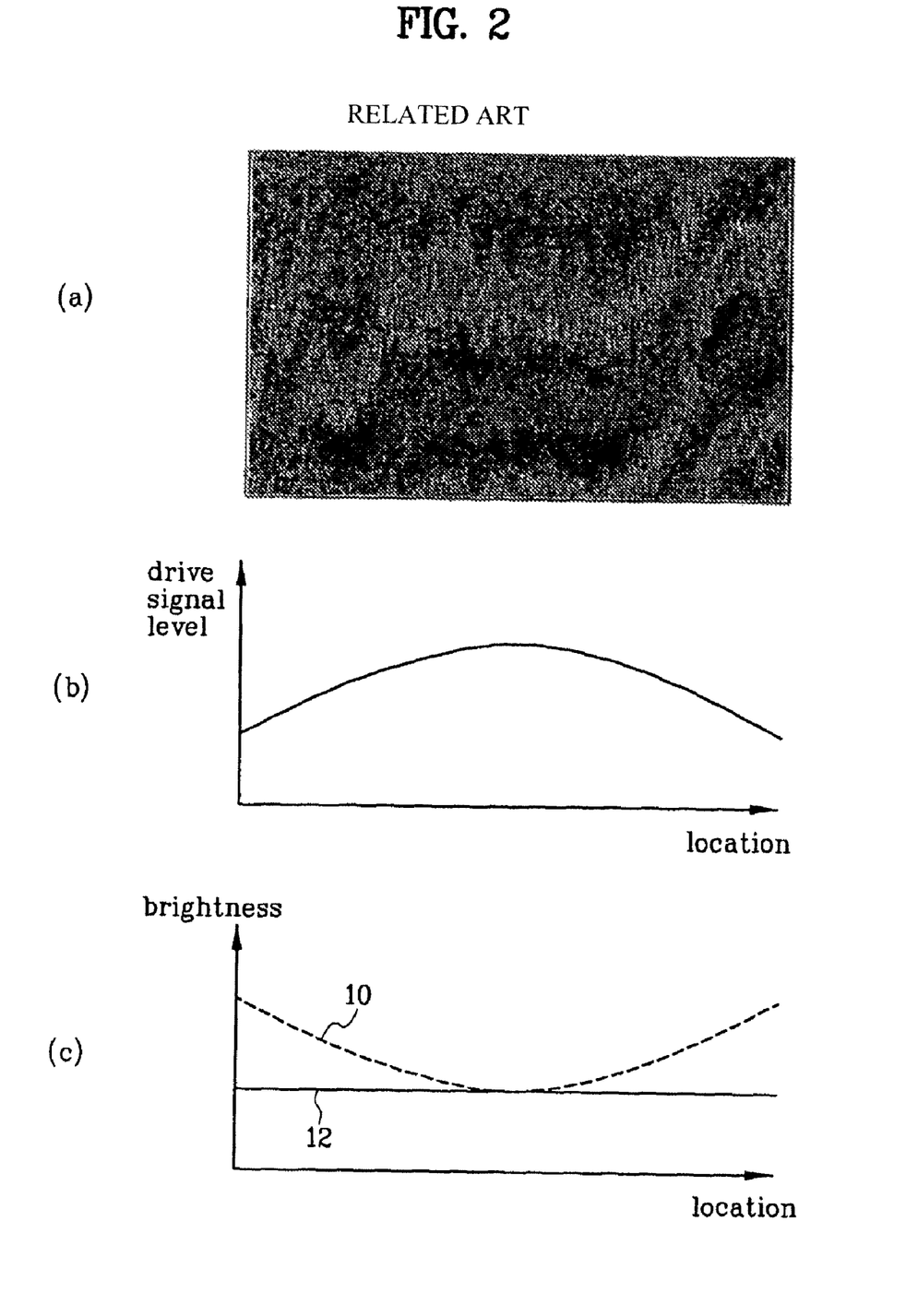
FIGS. 2A~2C are conceptual diagrams illustrating correction of the brightness difference shown in FIG. 1B.

FIGS. 2A to 2C are conceptual diagrams illustrating correction of the brightness difference shown in FIG. 1B. In more detail, FIG. 2A shows the distribution of the screen brightness. FIG. 2B is a graph illustrating a light-quantity drive signal. FIG. 2C is a graph of the correction result.

In order to correct the brightness difference shown in FIG. 1B, the level of the laser drive signal is adjusted as shown in FIG. 2B. In the case of adjusting the drive-signal level, the brightness difference 10 between the screen center and the screen edge may be adjusted to be uniform as shown in FIG. 2C.

However, the screen display device is driven at a low brightness of the laser beam, such that overall brightness may unavoidably deteriorate. The laser-beam brightness shown in FIG. 2B must be adjusted according to locations, such that an additional signal processing control is required to adjust the laser-beam brightness.

Figure 3:
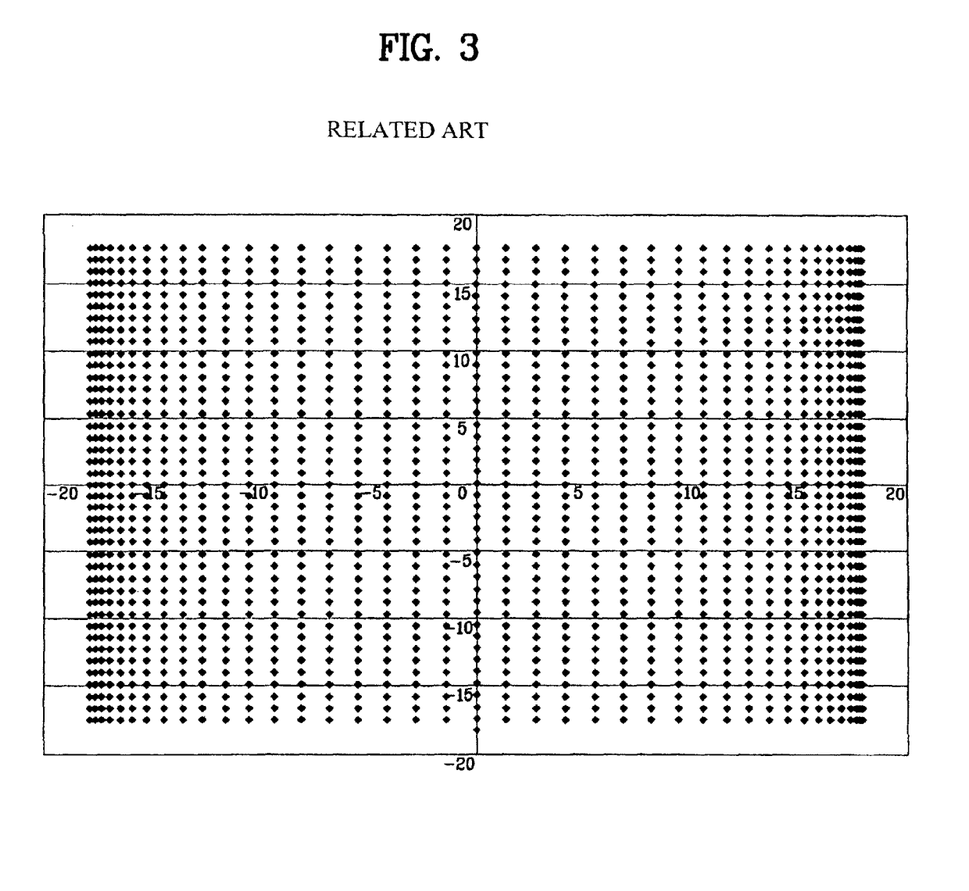
FIG. 3 shows a screen distortion depending upon the scanning speed.

FIG. 3 shows the screen distortion depending upon the scanning speed.

In this case, when the laser beam scanned by the micro-scanning mirror moves on the screen, the moving speed measured at the center of the screen is difference from another moving speed measured at the edge of the screen. Therefore, if the image is transmitted at the same speed during the horizontal scanning operation, the distorted screen image shown in FIG. 3 may occur.

SUMMARY OF THE INVENTION

Accordingly, the present invention is directed to a scanning display device that substantially obviates one or more problems due to limitations and disadvantages of the related art.

An object of the present invention is to provide a scanning display device for improving the difference in brightness of the screen, and at the same time increasing a brightness of the screen.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a scanning display device comprises: first to M-th scan mirrors (where M is an integer of at least 2), each of which scans a light signal in a first direction; and a scanning unit for scanning the light signal scanned by each of the first to M-th scan mirrors in a second direction, wherein a m-th scan mirror (where $1 \leq m \leq M-1$) scans the light signal in the first direction, and a n-th scan mirror (where $2 \leq n \leq M$) adjacent to the m-th scan mirror scans the light signal scanned by the m-th scan mirror in the first direction.

In another aspect of the present invention, there is provide a scanning display device comprising: (M+Q+1)-th to (M+Q+R)-th scan mirrors (where M, Q, or R is a positive integer of at least 2), each of which scans a light signal in first and second directions; an i-th scan mirror (where $M+Q+1 \leq i \leq M+Q+R-1$) scans the light signal in the first and second directions; and a j-th scan mirror (where $M+Q+2 \leq j \leq M+Q+R$) adjacent to the i-th scan mirror scans the light signal scanned by the i-th scan mirror in the first and second directions.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 4:
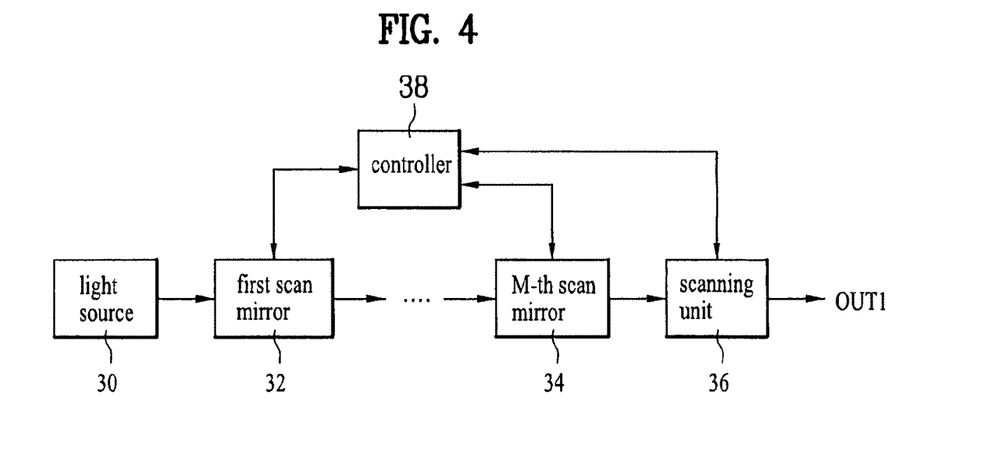
FIG. 4 is a block diagram illustrating a scanning display device according to a preferred embodiment of the present invention.

FIG. 4 is a block diagram illustrating a scanning display device according to a preferred embodiment of the present invention.

Referring to FIG. 4, the scanning display device includes a light source 30, first to M-th scan mirrors 32~34, the scanning unit 36, and the controller 38. In this case, M is a positive integer of at least 2.

The light source 30 shown in FIG. 4 generates a light signal such as a laser beam, and transmits the light signal to the first scan mirror 32. For this purpose, the light source 30 may generate the laser beam acting as the parallel light.

The first to M-th scan mirrors 32~34 have different drive widths, and are driven at different drive frequencies. Each of the first to M-th scan mirrors scans the light signal generated from the light source 30 in a first direction. In this case, in order to scan the light signal in the same direction using the first to M-th scan mirrors, the above-mentioned scan mirrors are driven by a rotating shaft having the same direction.

In more detail, the m-th scan mirror (where $1 \leq m \leq M-1$) scans the light signal in the first direction, and the n-th scan mirror (where $2 \leq n \leq M$) adjacent to the m-th scan mirror scans the light signal scanned by the m-th scan mirror in the first direction.

For example, if the value of M is 2, the first scan mirror 32 scans the light signal received from the light source 30 in the first direction, and the second scan mirror 34 adjacent to the first scan mirror 32 scans the light signal scanned by the first scan mirror 32 in the first direction, and outputs the scanned light signal to the scanning unit 36. In this case, the first scan mirror 32 and the second scan mirror have different drive widths, and are driven at different drive frequencies.

In other words, the number of light scanning actions per second of the first scan mirror 32 is different from the number of light scanning actions per second of the second scan mirror 34. The light-scanning width (or the light-scanning angle) of the first scan mirror 32 is different from that of the second scan mirror 34.

In the meantime, the scanning unit scans the light signal scanned by the M-th scan mirror 34 on the screen (not shown) via an output terminal OUT1 in a second direction different from the first direction.

The controller 38 controls drive frequencies and drive widths of not only the first to M-th scan mirrors 32~34 but also the scanning unit 36. For this purpose, the controller 38 determines whether each of the first to M-th scan mirrors 32~34 and the scanning unit 36 are normally operated at an initial setup drive frequency and drive width. The controller 38 controls each of the first to M-th scan mirrors 32~34 and the scanning unit 36 to be operated at the initial setup drive frequency and drive width.

According to a first preferred embodiment of the present invention, the scanning unit 36 may be indicative of a galvanometer. In this case, the galvanometer capable of implementing the scanning unit 36 scans the light signal scanned by the M-th scan mirror 34 via the output terminal OUT1.

Figure 5:
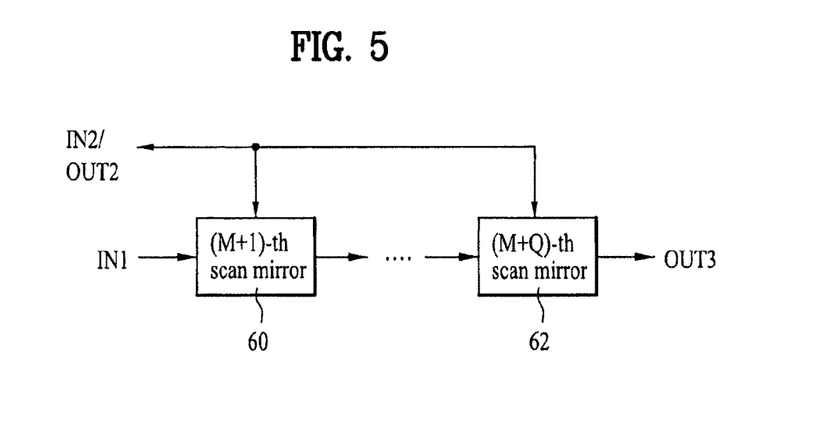
FIG. 5 is a block diagram illustrating a scanning unit shown in FIG. 4 according to a preferred embodiment of the present invention.

FIG. 5 is a block diagram illustrating the scanning unit 36 shown in FIG. 4 according to a preferred embodiment of the present invention. For example, the scanning unit 36 may include the (M+1)-th to (M+Q)-th scan mirrors 60~62 (where Q is a positive integer of at least 2).

According to a second preferred embodiment of the present invention, the scanning unit 36 of FIG. 5 may be implemented with the (M+1)-th to (M+Q)-th scan mirrors 60~62. The (M+1)-th to (M+Q)-th scan mirrors 60~62 have different drive widths, are driven at different drive frequencies, and scan the light signal in the second direction.

In more detail, a p-th scan mirror (where $M+1 \leq m \leq M+Q-1$) scans the light signal in the second direction, and the q-th scan mirror (where $M+2 \leq n \leq M+Q$) scans the light signal scanned by the p-th scan mirror in the second direction.

For example, if each of M and Q is 2, the third scan mirror 60 scans the light signal scanned by the second scan mirror 34 via the input terminal IN1 in the second direction. The fourth scan mirror 62 adjacent to the third scan mirror 60 scans the light signal scanned by the third scan mirror in the second direction via the output terminal OUT3. In this case, the third scan mirror 60 and the fourth scan mirror 62 are driven by different drive widths at different drive frequencies.

In more detail, the number of light scanning times per second of the third scan mirror 60 is different from that of the fourth scan mirror 62. The light-scanning width or (or a light-scanning angle) of the third scan mirror 60 is different from that of the fourth scan mirror 62.

According to the preferred embodiment of the present invention, the first direction may be set to a horizontal direction, and the second direction may be set to a vertical direction. In this case, the first to M-th scan mirrors 32~34 scan the light signal in the horizontal direction, the scanning unit 36 scans the light signal in the vertical direction, and the (M+1)-th to (M+Q)-th scan mirrors 60~62 scan the light signal in the vertical direction.

In this case, a single scan mirror from among the first to M-th scan mirrors 32~34 has a drive frequency equal to a horizontal synchronous frequency of an image to be scanned, and the remaining scan mirrors from among the first to M-th scan mirrors 32~34 have drive frequencies, each of which corresponds to an odd multiple of the horizontal synchronous frequency.

For ample, if M is 2, the drive frequency of the first scan mirror 32 is equal to the horizontal synchronous frequency, and the drive frequency of the second scan mirror 34 may be set to an odd multiple of the horizontal synchronous frequency, for example, three times the horizontal synchronous frequency.

A single scan mirror from among the (M+1)-th to (M+Q)-th scan mirrors 60~62 has a drive frequency equal to a vertical synchronous frequency of an image to be scanned, and the remaining scan mirrors from among the (M+1)-th to (M+Q)-th scan mirrors 60~62 have drive frequencies, each of which corresponds to an odd multiple of the vertical synchronous frequency. For example, if each of M and Q is 2, the drive frequency of the third scan mirror 60 is equal to the vertical synchronous frequency, and the drive frequency of the fourth scan mirror 62 may be set to an odd multiple of the vertical synchronous frequency, for example, three times the vertical synchronous frequency.

According to another preferred embodiment of the present invention, the first direction may be set to a vertical direction, and the second direction may be set to a horizontal direction. In this case, the first to M-th scan mirrors 32~34 scan the light signal in the vertical direction, the scanning unit 36 scans the light signal in the horizontal direction, and the (M+1)-th to (M+Q)-th scan mirrors 60~62 scan the light signal in the horizontal direction.

In this case, a single scan mirror from among the (M+1)-th to (M+Q)-th scan mirrors 60~62 has a drive frequency equal to a horizontal synchronous frequency of an image to be scanned, and the remaining scan mirrors from among the (M+1)-th to (M+Q)-th scan mirrors 60~62 have drive frequencies, each of which corresponds to an odd multiple of the horizontal synchronous frequency.

For example, if each of M and Q is 2, the drive frequency of the third scan mirror 60 is equal to the horizontal synchronous frequency, and the drive frequency of the fourth scan mirror 62 may be set to an odd multiple of the horizontal synchronous frequency, for example, three times the horizontal synchronous frequency.

A single scan mirror from among the first to M-th scan mirrors 32~34 has a drive frequency equal to a vertical synchronous frequency of an image to be scanned, and the remaining scan mirrors from among the first to M-th scan mirrors 32~34 have drive frequencies, each of which corresponds to an odd multiple of the vertical synchronous frequency. For ample, if M is 2, the drive frequency of the first scan mirror 32 is equal to the vertical synchronous frequency, and the drive frequency of the second scan mirror 34 may be set to an odd multiple of the vertical synchronous frequency, for example, three times the vertical synchronous frequency.

Each of the first to (M+Q)-th scan mirrors 32☐34 and 60☐62 shown in FIGS. 4☐5 has a drive width which is inversely proportional to the drive frequency.

For example, if M is 2, provided that the drive frequency of the first scan mirror 32 is set to the horizontal synchronous frequency, and the drive frequency of the second scan mirror 34 is set to an odd multiple of the horizontal synchronous frequency, the drive width of the second scan mirror 34 is less than that of the first scan mirror 32.

For example, the drive width of the second scan mirror 34 may be set to 0 to 1/10 times the drive width of the first scan mirror 32. Preferably, the drive width of the second scan mirror 34 may be set to 0.05 to 0.08 times of the drive width of the first scan mirror of the second scan mirror 34. Similarly, if each of M and Q is 2, provided that the drive frequency of the third scan mirror is set to the vertical synchronous frequency, and the drive frequency of the fourth scan mirror is set to an odd multiple of the vertical synchronous frequency, the drive width of the fourth scan mirror 62 is less than that of the third scan mirror 60. For example, the drive width of the fourth scan mirror 62 may be set to 0 to 1/10 times the drive width of the third scan mirror 60. Preferably, the drive width of the fourth scan mirror 62 may be set to 0.05 to 0.08 times the drive width of the third scan mirror 60.

The controller 38 shown in FIG. 38 receives the drive frequency and the drive width of the (M+1)-th to (M+Q)-th scan mirrors 60☐62 of FIG. 5 via the output terminal OUT2, and detects the received drive frequency and the received drive width of the (M+1)-th to (M+Q)-th scan mirrors 60☐62. If it is determined that the drive frequency and the drive width are not operated according to the initial setup condition, the controller 38 generates a control signal. In this case, the (M+1)-th to (M+Q)-th scan mirrors 60☐62 receive the control signal from the controller 38 via the input terminal IN2, and are operated by the initial setup drive width at the initial setup drive frequency.

Figure 6:
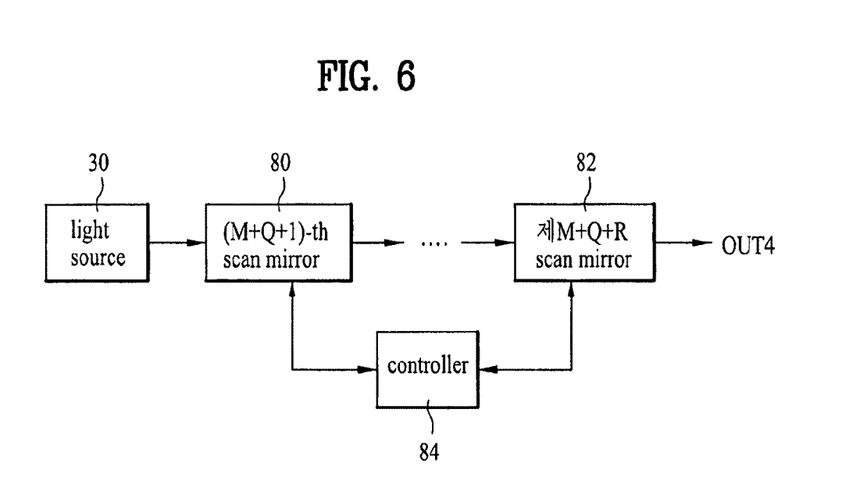
FIG. 6 is a block diagram illustrating a scanning display device according to another preferred embodiment of the present invention.

FIG. 6 is a block diagram illustrating a scanning display device according to another preferred embodiment of the present invention.

Referring to FIG. 6, the scanning display device according to another preferred embodiment of the present invention includes the (M+Q+1)-th to (M+Q+R)-th scan mirrors 80☐82 (where R is a positive integer of at least 2) and the controller 84.

The (M+Q+1)-th to (M+Q+R)-th scan mirrors 80☐82 are driven by different drive widths at different drive frequencies, and scan the light signal in the first and second directions at the same time. In more detail, the i-th scan mirror (where M+Q+1≦i≦M+Q+R) scans the light signal in the first and second directions at the same time, and the j-th scan mirror (where M+Q+2≦j≦M+Q+R) adjacent to the i-th scan mirror scans the light signal scanned by the i-th scan mirror in the first and second directions at the same time. In this case, the (M+Q+R)-th scan mirror 82 scans the light signal scanned by the (M+Q+R−1)-th scan mirror on the screen via the output terminal OUT4.

For example, if each of M, Q, and R is 2, the fifth scan mirror 80 scans the light signal received from the light source 30 in the first and second direction at the same time. The sixth scan mirror 82 adjacent to the fifth scan mirror 80 scan the light signal scanned by the fifth scan mirror 80 in the first and second direction at the same time. In this case, the fifth scan mirror 80 and the sixth scan mirror 82 are driven by different drive widths at different drive frequencies. In other words, the number of light-scanning times per second of the fifth scan mirror 80 is different from that of the sixth scan mirror 82. The light-scanning width (or the light-scanning angle) of the fifth scan mirror 80 is different from that of the sixth scan mirror 82.

The controller 84 controls drive frequencies and drive widths of only the (M+Q+1)-th to (M+Q+R)-th scan mirrors 80☐82. For this purpose, the controller 84 determines whether each of the (M+Q+1)-th to (M+Q+R)-th scan mirrors 80☐82 are normally operated at an initial setup drive frequency and drive width. Therefore, the M+Q+1)-th to (M+Q+R)-th scan mirrors 80☐82 are operated at initial setup drive frequency and drive width.

According to the present invention, the first direction may be set to a horizontal direction, and the second direction may be set to a vertical direction. Otherwise, the first direction may be set to the vertical direction, and the second direction may be set to the horizontal direction.

In the meantime, each of the first to (M+Q+R)-th scan mirrors 32□34, 60□62, and 80□82 shown in FIGS. 4□6 may be implemented with a micro-scanning mirror.

In this case, in order to perform the horizontal scanning action, a single scan mirror from among the (M+Q+1)-th to (M+Q+R)-th scan mirrors 80~82 has a drive frequency equal to a horizontal synchronous frequency of an image to be scanned, and the remaining scan mirrors from among the (M+Q+1)-th to (M+Q+R)-th scan mirrors 80~82 have drive frequencies, each of which corresponds to an odd multiple of the horizontal synchronous frequency.

For example, if each of M, Q, and R is 2, the drive frequency of the fifth scan mirror 80 is equal to the horizontal synchronous frequency, and the drive frequency of the sixth scan mirror 82 may be set to an odd multiple of the horizontal synchronous frequency, for example, three times the horizontal synchronous frequency.

In order to perform the vertical scanning action, a single scan mirror from among the (M+Q+1)-th to (M+Q+R)-th scan mirrors 80~82 has a drive frequency equal to a vertical synchronous frequency of an image to be scanned, and the remaining scan mirrors from among the (M+Q+1)-th to (M+Q+R)-th scan mirrors 80~82 have drive frequencies, each of which corresponds to an odd multiple of the vertical synchronous frequency.

For example, if each of M, Q, and R is 2, the drive frequency of the fifth scan mirror 80 is equal to the vertical synchronous frequency, and the drive frequency of the sixth scan mirror 82 may be set to an odd multiple of the vertical synchronous frequency, for example, three times the vertical synchronous frequency.

Each of the (M+Q+1)-th to (M+Q+R)-th scan mirrors 80□82 shown in FIG. 6 has a drive width which is inversely proportional to the drive frequency.

For example, if each of M, Q, and R is 2, provided that the drive frequency of the fifth scan mirror 80 is assigned to the horizontal synchronous frequency, and the drive frequency of the sixth scan mirror 82 is assigned to an odd multiple of the horizontal synchronous frequency, the drive width of the fifth scan mirror 80 is less than that of the sixth scan mirror 82.

Similarly, provided that the drive frequency of the fifth scan mirror 80 is assigned to the vertical synchronous frequency, and the drive frequency of the sixth scan mirror 82 is assigned to an odd multiple of the vertical synchronous frequency, the drive width of the sixth scan mirror 82 is less than that of the fifth scan mirror 80.

For example, the drive width of the sixth scan mirror 82 may be set to 0 to 1/10 times the drive width of the fifth scan mirror 80. Preferably, the drive width of the sixth scan mirror may be set to from 0.05 to 0.08 times the drive width of the fifth scan mirror 80.

According to the present invention, it is preferable that a distance between the scan mirrors shown in FIGS. 4, 5, and 6 must be minimized, such that individual scan mirrors are arranged to be close to each other. For example, the scanning angle of the first scan mirror 32 is 1° or 2°. Therefore, when the light signal reflected from the first scan mirror 32 reaches the second scan mirror, the reflection location of the light signal may be changed to another.

Indeed, if a distance between the first scan mirror 32 and the second scan mirror is set to 5 mm, the location of the light signal from the first scan mirror 32 to the second scan mirror is changed from about 0.09 to 0.17 mm. If the scan mirrors are arranged in the form of a vertical line in consideration of the sinusoidal movement of the scan mirrors, the above-mentioned arrangement of the scan mirrors may be implemented without the loss of the light signal.

For the convenience of description, if M is 2, it is assumed that the scanning unit 36 is implemented with a galvanometer, the first direction is set to the horizontal direction, the second direction is set to the vertical direction, the scan mirror is set to the micro-scanning mirror, and the light signal is set to the laser beam. Under the above-mentioned condition, operations of the scanning display device shown in FIG. 4 will hereinafter be described with the annexed drawings.

Figure 7:
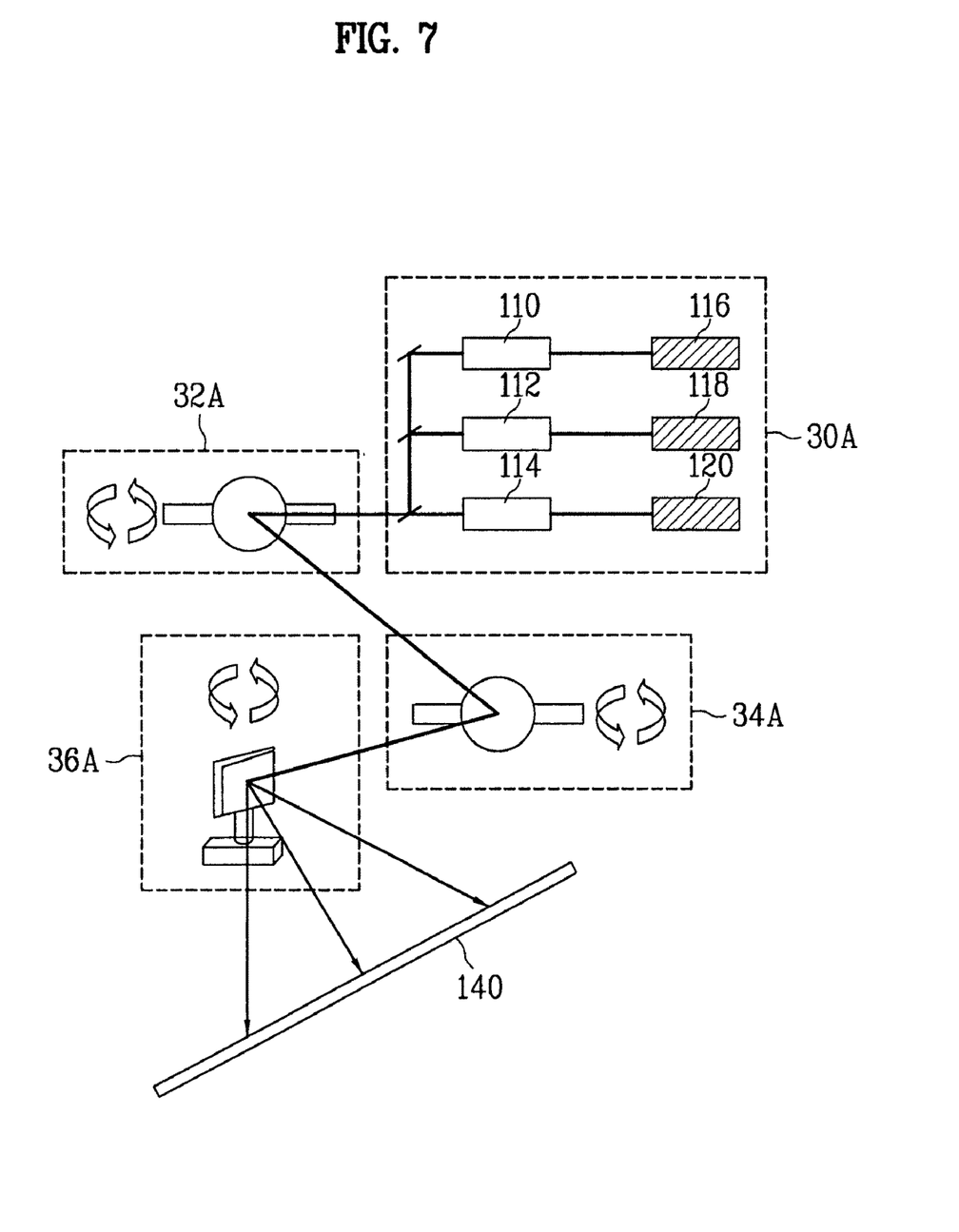
FIG. 7 is a block diagram illustrating a scanning display device according to a still another preferred embodiment of the present invention.

FIG. 7 is a block diagram illustrating a scanning display device according to still another preferred embodiment of the present invention.

Referring to FIG. 7, the scanning display device includes a light source 30A, a first scan mirror 32A, a second scan mirror 34A, a scanning unit 36A, and a screen 140.

The light source 30A, the first scan mirror 32A, the second scan mirror 34A, the scanning unit 36A shown in FIG. 7 correspond to the light source 30, the first scan mirror 32, the second scan mirror 34, and the scanning unit 36 shown in FIG. 4, respectively, such that the operations of the above-mentioned components of FIG. 7 are equal to those of FIG. 4.

The light source 30A of FIG. 7 includes a plurality of light drive parts 116, 118, and 120 and a plurality of light emitting parts 110, 112, and 114, such that it generates the laser beam.

For example, the light emitting part 110 controls the light drive part 116 to generate a green (G) light signal having a determined level. The light emitting part 112 controls the light drive part 118 to generate a red (R) light signal having a determined level. The light emitting part 114 controls the light drive part 120 to generate a blue (B) light signal having a determined level.

In this case, if the drive frequency of the first scan mirror 32A is set to the drive frequency of the horizontal synchronous frequency of an image to be scanned on the screen 140, the first scan mirror 32A driven at the horizontal synchronous frequency scans the light signal received from the light source 30A on the second scan mirror 34A in the horizontal direction.

If the drive frequency of the second scan mirror 34A is set to three times the horizontal synchronous frequency, the second scan mirror 34A driven at three times the horizontal synchronous frequency scans the light signal scanned by the first scan mirror 32A on the scanning unit 36A in the horizontal direction. The scanning unit 34A implemented with the galvanometer scans the light signal scanned by the second scan mirror 34A on the screen in the vertical direction.

Figure 8:
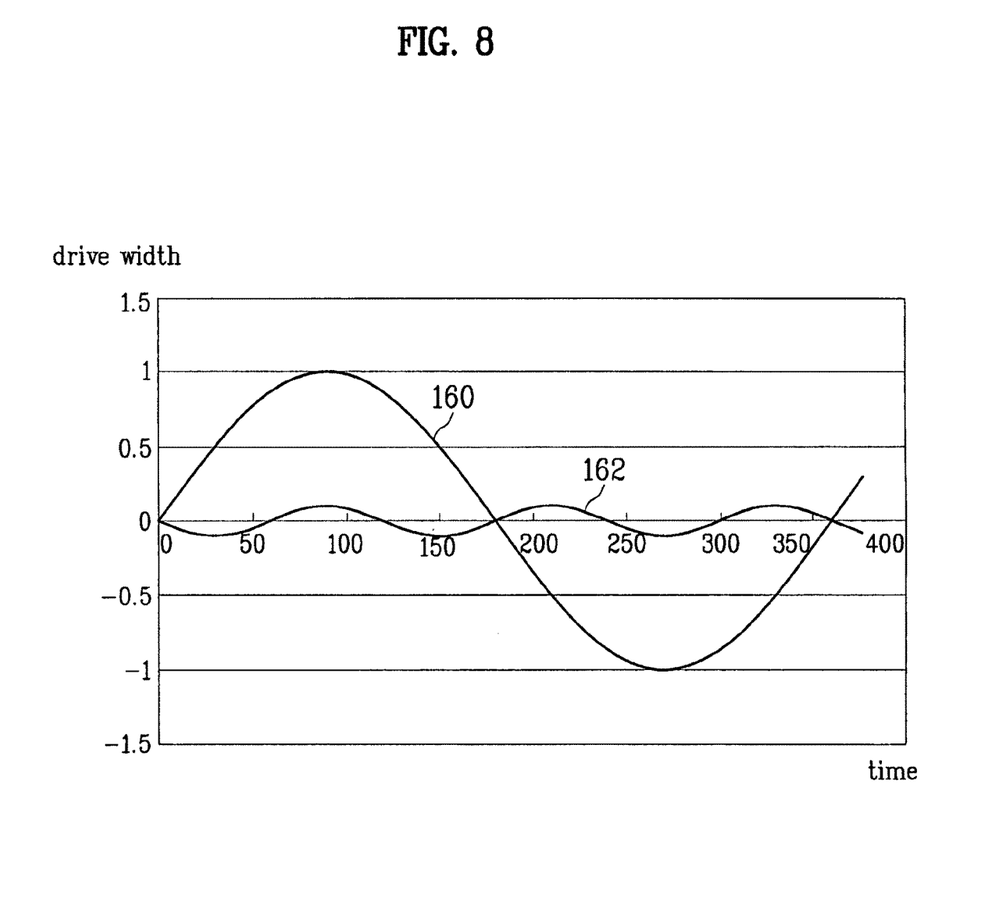
FIG. 8 exemplarily shows drive widths and drive frequencies of first and second scan mirrors shown in FIG. 7 according to the present invention.

FIG. 8 exemplarily shows drive widths and drive frequencies of first and second scan mirrors shown in FIG. 7 according to the present invention. FIG. 8 exemplarily shows a graph illustrating drive frequencies and drive widths of the first and second scan mirrors 32A and 34A. In FIG. 8, a vertical axis is indicative of the drive width, and a horizontal axis is indicative of a time.

Referring to FIG. 8, the drive frequency of the first scan mirror 32A (160) is equal to the horizontal synchronous frequency, and the drive frequency of the second scan mirror 34A (162) is equal to three times the horizontal synchronous frequency. In this case, the drive width of the second scan mirror 34A (162) may be set to 0 to 1/10 times the drive width of the first scan mirror 32A (160).

Figure 9:
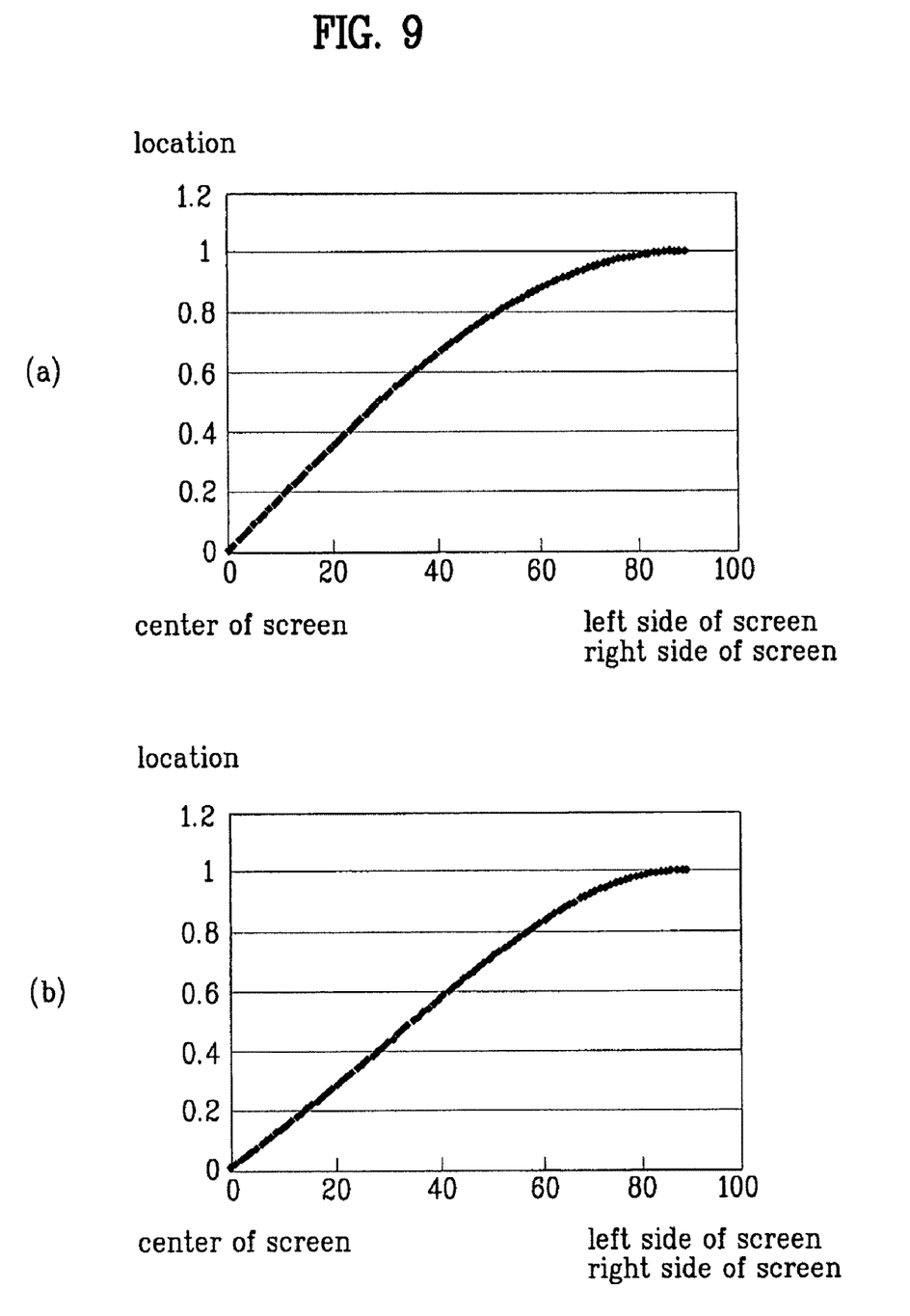
FIGS. 9A~9B show a scanning format displayed on the screen of the scanning display device according to the present invention.

FIGS. 9A□9B show a scanning format displayed on the screen of the scanning display device according to the present invention.

FIG. 9A shows a graph illustrating the light scanning format of the conventional display device. FIG. 9B shows a graph illustrating the light scanning format of the scanning display device according to the present invention.

The conventional display device shown in FIG. 9A scans the light signal on the screen in the form of a sinusoidal wave. However, the scanning display device according to the present invention scans the light signal at the center of the screen, the left side of the screen, or the right side of the screen at a predetermined speed, as shown in FIG. 9B.

FIGS. 10A–10B show a brightness distribution of the scanning display device according to the present invention.

FIG. 10A is a graph illustrating a brightness distribution of the light signal in the case of using the conventional display device. FIG. 10B is a graph illustrating a brightness distribution of the light signal in the case of using the scanning display device according to the present invention.

As can be seen from FIG. 10A, in the case of the conventional display device, the closer the brightness is to the center of the screen, the darker the brightness.

In addition, the closer the brightness is to the edge of the screen, the lighter the brightness. However, the scanning display device according to the present invention has uniform brightness distribution at the center, left, and right side of the screen, as shown in FIG. 10B.

Figure 10:
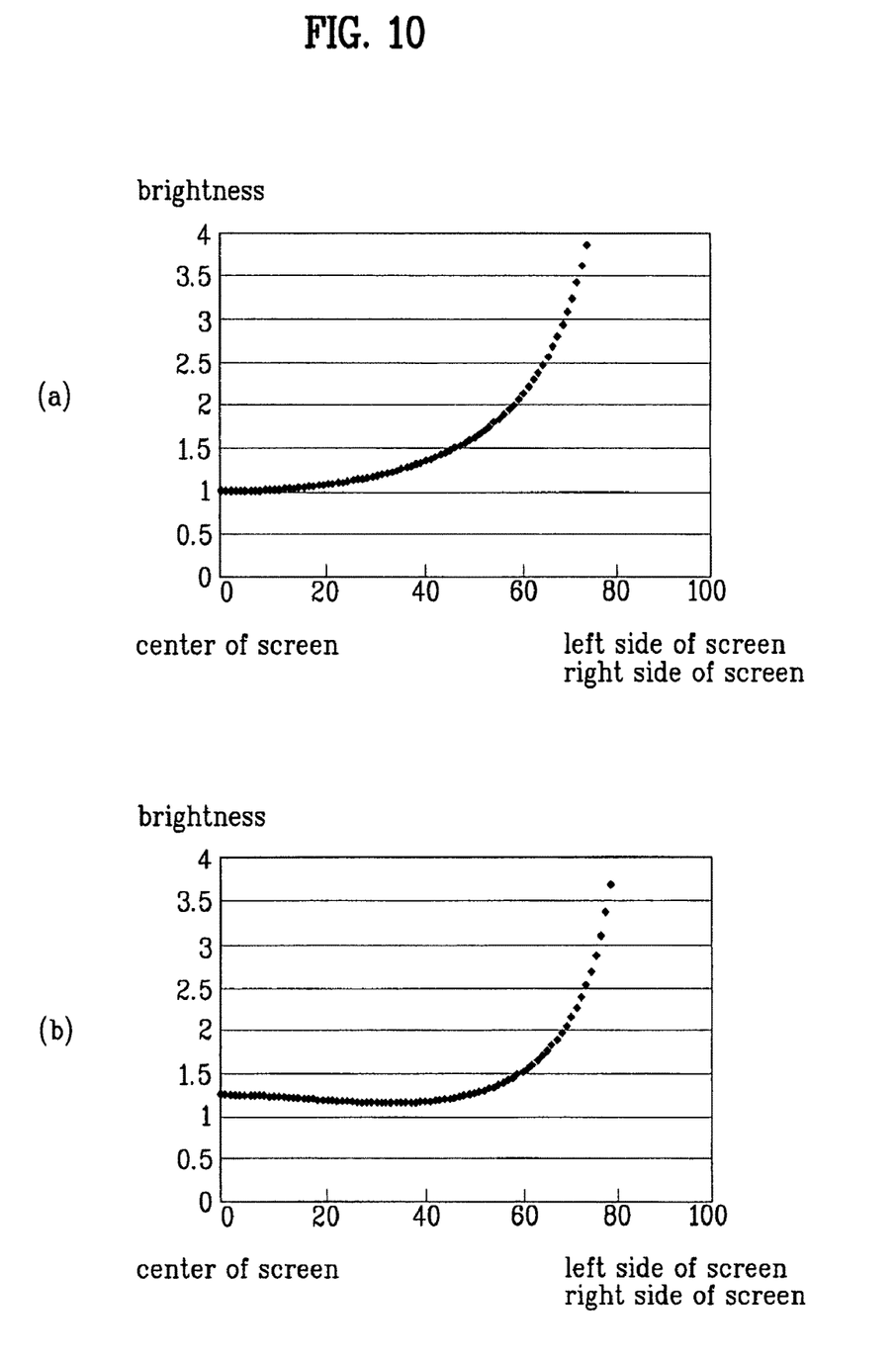
FIGS. 10A~10B show a brightness distribution of the scanning display device according to the present invention.

Referring to FIGS. 10–10B, the conventional display device sets an overall screen brightness to a minimum brightness value, however, the scanning display device according to the present invention can improve the screen brightness by about 20% as compared to the conventional display device.

As apparent from the above description, the scanning display device according to the present invention uses a plurality of scan mirrors, which have different drive frequencies and different drive widths, in order to perform the horizontal or vertical scanning action.

Therefore, the scanning display device allows the overall brightness of the screen to be uniform, and improves the brightness uniformity, such that it can easily process the light drive signal, resulting in the improvement of overall brightness.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A scanning display device comprising:
    a first scan mirror group including a plurality of scan mirrors for scanning a light signal in a horizontal direction; and
    a second scan mirror group including a plurality of scan mirrors for scanning the light signal scanned by the first scan mirror group in a vertical direction,
    wherein a single scan mirror from among the first scan mirror group has a drive frequency equal to a horizontal synchronous frequency of an image to be scanned, and the remaining scan mirrors from the first scan mirror group have drive frequencies, each of which corresponds to an odd multiple of the horizontal synchronous frequency, wherein the remaining scan mirrors of the first scan mirror group are different from each other in the drive frequency,
    wherein a single scan mirror from among the second scan mirror group has a drive frequency equal to a vertical synchronous frequency of an image to be scanned, and the remaining scan mirrors from the second scan mirror group have drive frequencies, each of which corresponds to an odd multiple of the vertical synchronous frequency, wherein the remaining scan mirrors of the second scan mirror group are different from each other in the drive frequency, and
    wherein the first and second scan mirror groups include a first scan mirror and a second mirror wherein the second scan mirror scans the light signal reflected directly from the first scan mirror, respectively,
    the first and second scan mirrors are arranged to be adjacent to each other, and driven by a rotating shaft having the same direction, and
    the drive frequency of the second scan mirror to be an odd multiple of that of the first scan mirror.

2. The scanning display device according to claim 1, wherein the scan mirrors of the first and second scan mirror groups have different drive widths or are driven at different drive frequencies.

3. The scanning display device according to claim 1, wherein at least one of the first and second scan mirror groups is indicative of a galvanometer.

4. The scanning display device according to claim 1, wherein the light signal is indicative of a laser beam.

5. The scanning display device according to claim 1, wherein the scan mirrors of the first and second scan mirror groups are indicative of micro-scanning mirrors, respectively.

6. The scanning display device according to claim 1, wherein each of the scan mirrors of the first and second scan mirror groups has a drive width which is inversely proportional to a drive frequency.

7. The scanning display device according to claim 1, further comprising:
    a controller for controlling a drive frequency and a drive width of each of the scan mirrors of the first and second scan mirror groups.

8. A scanning display device comprising:
    a light source for generating a light signal; and
    a scan mirror group including a plurality of scan mirrors for scanning the light signal in horizontal and vertical directions;
    wherein a single scan mirror from among the scan mirror group has a drive frequency equal to a horizontal synchronous frequency of an image to be scanned, and the remaining scan mirrors from the scan mirror group have drive frequencies, each of which corresponds to an odd multiple of the horizontal synchronous frequency, wherein the remaining scan mirrors are different from each other in the drive frequency,
    wherein a single scan mirror from among the scan mirror group has a drive frequency equal to a vertical synchronous frequency of an image to be scanned, and the remaining scan mirrors from the scan mirror group have drive frequencies, each of which corresponds to an odd multiple of the vertical synchronous frequency, wherein the remaining scan mirrors are different from each other in the drive frequency, and
    wherein the scan mirror group include a first scan mirror and a second mirror wherein the second scan mirror scans the light signal reflected directly from the first scan mirror,
    the first and second scan mirrors are arranged to be adjacent to each other, and driven by a rotating shaft having the same direction, and
    the drive frequency of the second scan mirror to be an odd multiple of that of the first scan mirror.

9. The scanning display device according to claim 8, wherein the scan mirrors of the scan mirror group scan the light signal in the first and second directions at the same time.

* * * * *